June 7, 1938.  F. R. ZIMMERMAN  2,119,765
MACHINE FOR COUPLING UPHOLSTERY SPRINGS
Filed Feb. 18, 1937  7 Sheets-Sheet 5

June 7, 1938.　　　F. R. ZIMMERMAN　　　2,119,765
MACHINE FOR COUPLING UPHOLSTERY SPRINGS
Filed Feb. 18, 1937　　　7 Sheets-Sheet 6

Witness:
E. Camporini

Inventor:
Fred R. Zimmerman,
By: Rudolph Wm Lotz
Attorney.

June 7, 1938.  F. R. ZIMMERMAN  2,119,765
MACHINE FOR COUPLING UPHOLSTERY SPRINGS
Filed Feb. 18, 1937  7 Sheets-Sheet 7

Inventor:
Fred R. Zimmerman,
By Rudolph
Attorney.

Witness:
E. Camporini

Patented June 7, 1938

2,119,765

UNITED STATES PATENT OFFICE 2,119,765

MACHINE FOR COUPLING UPHOLSTERY SPRINGS

Fred R. Zimmerman, Chicago, Ill., assignor to Nachman-Springfilled Corporation, Chicago, Ill., a corporation of Illinois Application February 18, 1937, Serial No. 126,355

15 Claims. (Cl. 140—3)

The present invention has for its object to provide certain new and useful improvements in machines used in the production of all-metal spring assemblies for upholstery wherein the component upholstery springs are secured to each other in the manner illustrated and described in the Re-issue Patent No. 19,347 to Oliver Hetherington, a machine of the type to which said improvements relate being illustrated and described in Letters Patent to Chace D. Gilmore No. 2,015,927.

The machine of the present invention may be used or adapted for use for other specific purposes than that which is indicated above, but in the accompanying drawings the same is illustrated as applied to the type of machine constituting the subject matter of said Gilmore patent.

The main object of the present invention is to provide a machine of the type specified which is more efficient, reliable and durable than the machine of said Gilmore patent.

In the accompanying drawings illustrating a suitable embodiment of the invention.

In said Hetherington reissue patent, the upholstery springs are shown as secured together by means of wire ties, each consisting of a short length of wire which is passed through the opening defined by the overlapped arcuate portions of the terminal coils of two springs and having its opposite end portions coiled about the points at which said arcuate portions meet.

As illustrated and described in said Gilmore patent, the said arcuate overlapped portions of said springs are disposed in the longitudinal recess of a rotary coiling or twisting head which is provided with an angular opening extending from end to end of said head and the axis of which intersects said recess, the short length of wire being passed through said opening in said head and through the opening defined by the said overlapped portions of said springs, said head being then rotated on an axis which is common to said head and the inner end portion of said recess to coil the end portions of the wire about the meeting points of the overlapped portions of said springs.

The said coiling or twisting head of said Gilmore patent is disposed at an elevation above a flat supporting surface for the component springs of the ultimate assembly, said surface being large and free of obstruction to enable a spring assembly of great length and width to be constructed thereon.

Figure 1:
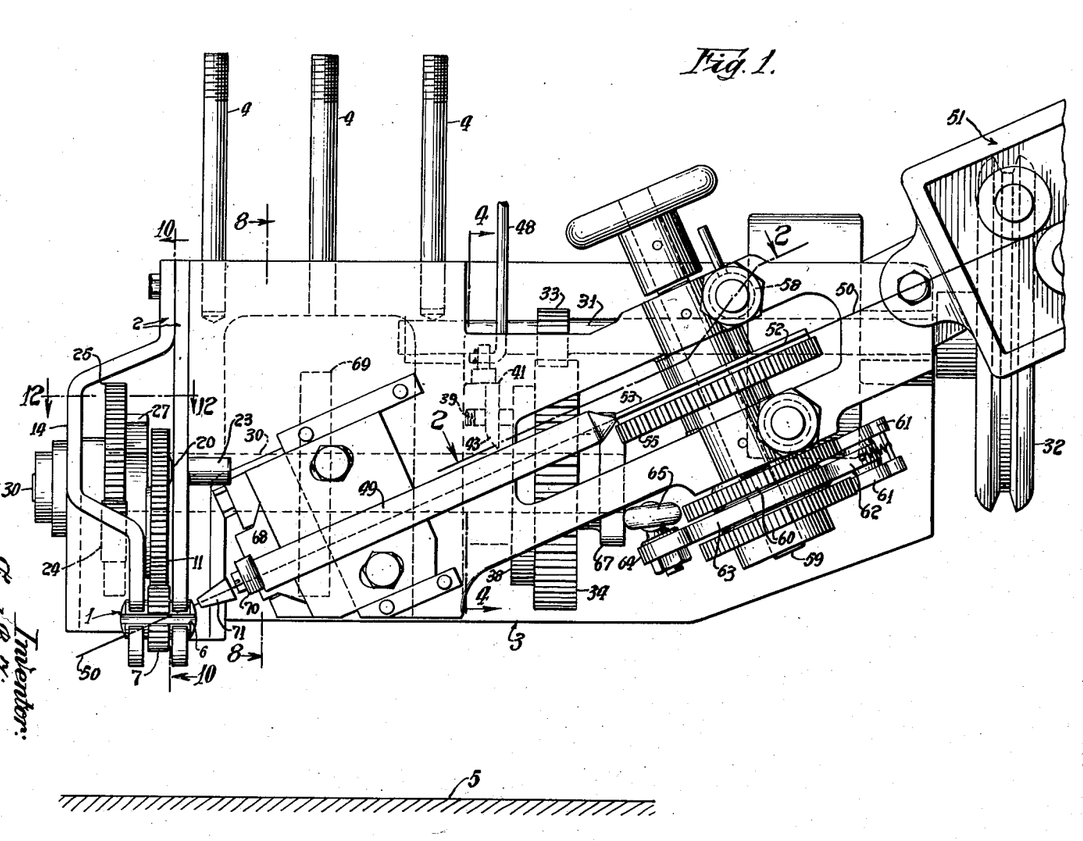
Fig. 1 is a side elevation of a machine of the type illustrated in the said Gilmore patent wherein the wire feeding and cut-off mechanism of the present invention, also shown in side elevation, is substituted for the feeding and cut-off mechanism illustrated in said patent.

In the machine illustrated in the accompanying drawings, reference being had to Fig. 1, the coiling or twisting head 1 is journalled in bearings at the lower ends of a pair of plates 2 secured at their upper ends to a casing 3 which constitutes the frame of the machine. Said casing 3 is suspended from a suitable support (not shown) to which it is secured rigidly by means of the rods 4 and nuts (not shown) engaged with the threaded end portions of said rods and with said support.

The head 1 is thus disposed with its horizontal axis of rotation spaced a distance above the supporting surface 5 for upholstery springs, said distance being substantially equal to the height of the upholstery springs of the assembly to be constructed.

As shown in detail in Figs. 13, 14, 16 and 17, the said head 1 is provided with a slot 6 extending throughout the length of said head and past its axis of rotation, the inner wall of said recess being arcuate and concentric with said axis.

Between its ends the said head is equipped with spur-gear teeth 7 which extend arcuately around the same from one to the other side walls of the slot 6, said walls being shown as upper and lower parallel walls spaced from each other a distance slightly greater than twice the gauge of the heaviest wire of which the upholstery springs of the assembly are composed. A pair of overlapped arcuate portions of the terminal coils of a pair of said springs 8 are shown positioned in the recess 6 of the head 1 in the several last-mentioned figures of the drawings, the wire receiving opening 9 and the short length 10 of tie wire extending through said opening 9 and through the opening defined by the overlapped portions of the springs 8 being shown most clearly in Fig. 17.

The gear teeth 7 of the head 1 mesh with the spur gear wheel 11 (Figs. 13 and 14) which is rotatably mounted upon a hub member 12 rigid with the shaft 13 journalled in bearings in the said plates 2, one of the latter being equipped with an outwardly offset portion 14 (Fig. 1) in which one of the last-mentioned bearings is disposed.

Mounted upon the hub member 12 is a collar 15 between which and the flange 16 of the hub member 12, the middle portion of the gear wheel 11 is engaged.

Figures 13, 14, 15, 16, 18:
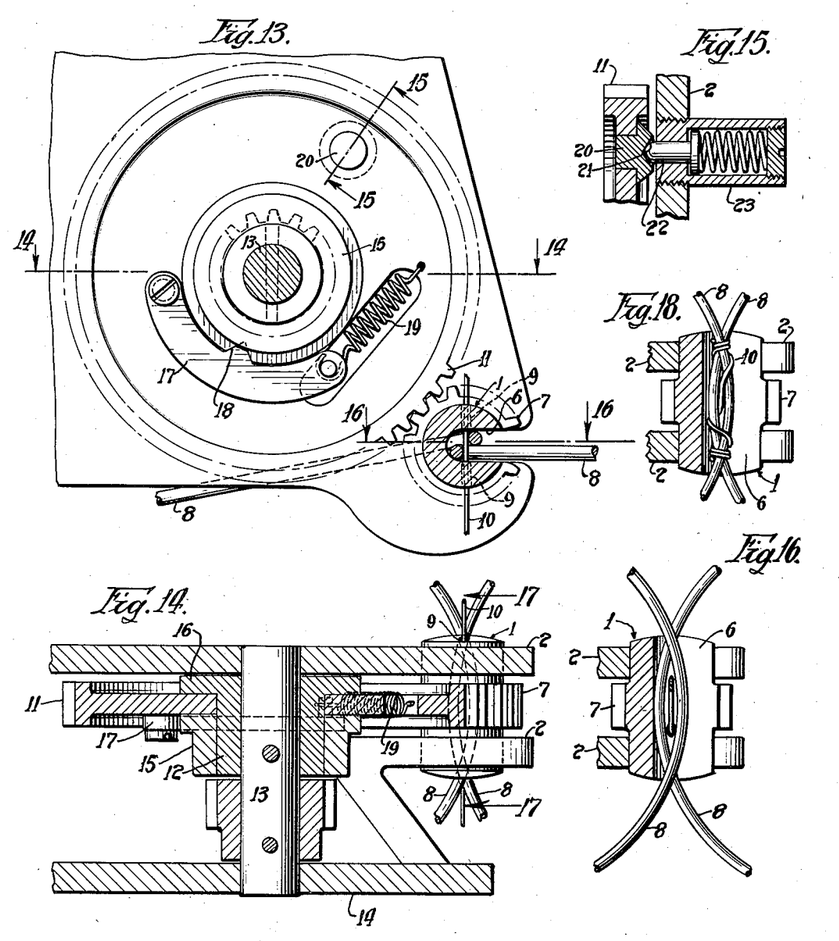
Fig. 13 is a detail vertical transverse sectional view taken on the line 13—13 of Fig. 12.
Fig. 14 and Figs. 15 and 16 are detail sectional views taken on the lines 15—15, 16—16 and 17—17, respectively, of Fig. 13.
Fig. 18 is a plan section similar to Fig. 16 showing the coiled wire tie after completion of the operation of the coiling head of the machine.
Figure 17:
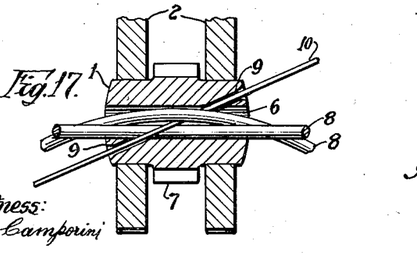
Fig. 17 is a detail vertical sectional view taken on the line 17—17 of Fig. 14.

Pivotally secured to said wheel 11 at one of its ends is an arcuate arm 17 which is equipped between its ends with a V-shaped projection 18 normally held engaged in a V-shaped recess in the collar 15 by means of the tension spring 19 secured at one end to the other end of the arm 17 and at its opposite end is anchored suitably to the wheel 11 (see Fig. 14).

Also mounted in the wheel 11 is a head 20 having a sphero-convex outer face in the center of which is a sphero-concave recess 21 in which the outer end portion of a spring-pressed plunger 22 engages, the said head and spring engaging the same being suitably mounted in a casing 23 mounted upon one of the plates 2 (see Fig. 15).

The arcuate arm 17 constitutes a tooth clutch member capable of being automatically disengaged from the collar 15 in the event that resistance to rotation of the head 1 should exceed the limit determined by the spring 19 as by reason of improper positioning of the arcuate overlapped portions of the springs in the recess 6 or other causes, thus preventing stripping of gears or other damage to the machine.

The said gear wheel 11 is of pitch diameter constituting a multiple of the pitch diameter of the gear teeth of the head 1 and is rotated for one complete revolution at each operation in order that the recess 6 of the head 1 may be horizontally disposed after completion of each operation thereof and said head 20 and plunger 22 cooperate to take up play in the intermeshed teeth 7 and the teeth of gear wheel 11 at the instant of completion of each operation to assure the last-mentioned position of said recess 6.

Figure 10:
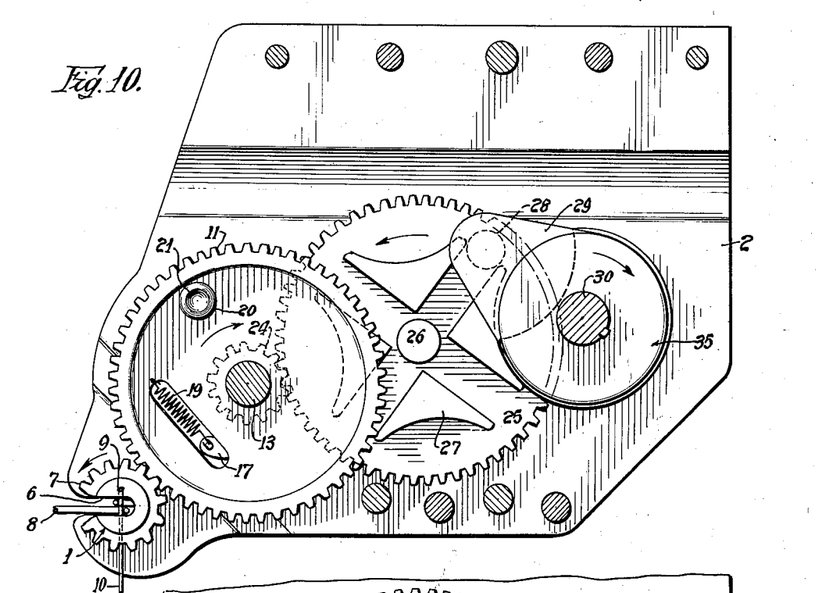
Fig. 10 is a vertical transverse sectional view on an enlarged scale taken on the line 10—10 of Fig. 1.
Figure 11:
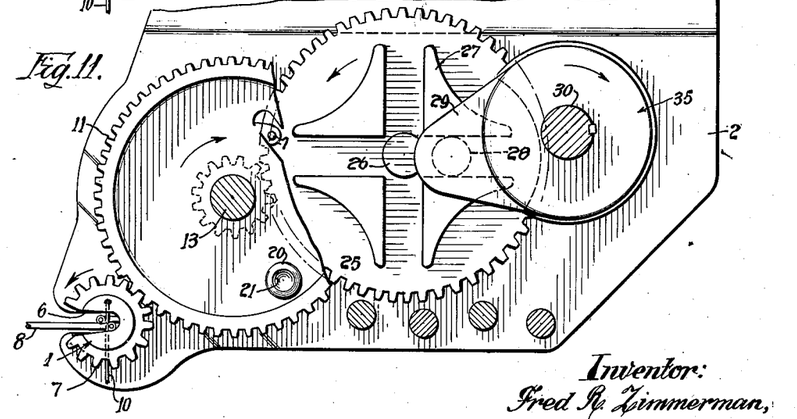
Fig. 11 is a view similar to Fig. 10 showing the parts in another position.
Figure 12:
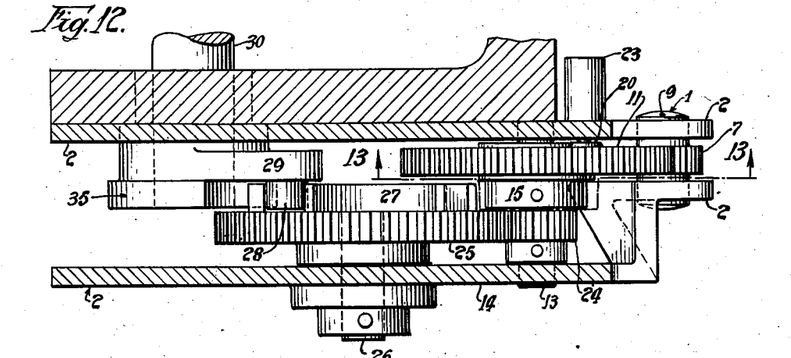
Fig. 12 is a detail plan sectional view on an enlarged scale taken on the line 12—12 of Fig. 1.

Referring now to Figs. 10, 11 and 12:

Rigid with the shaft 13 is a spur-pinion 24 which meshes with a spur gear wheel 25 rigid with a shaft 26 journalled in bearings in the plates 2. Said gear wheel 25 is actuated by a conventional Geneva movement mechanism of which the radially slotted element 27 is here shown as constituting an integral part of the gear wheel 25 and is actuated by the crank pin 28 of the crank 29 mounted upon the shaft 30.

During each revolution of the shaft 30, the gear wheel 25 is rotated through an arc of ninety degrees. The pitch diameters of the pinion 24 and gear wheel 25 are such as to impart to the shaft 13 a complete revolution for each quarter revolution of shaft 30.

Figure 4:
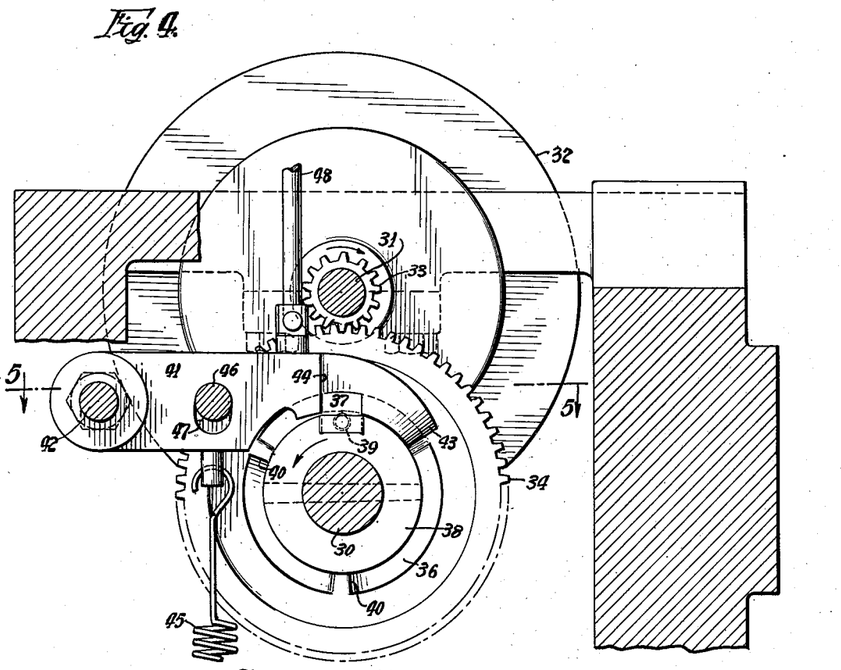
Fig. 4 is a vertical transverse sectional view taken on the line 4—4 of Fig. 1.

The drive shaft 31 of the machine is actuated by means of a belt driven sheave 32 (Figs. 1 and 4) and is equipped between its ends with a spur pinion 33 which meshes with the spur gear wheel 34 rotatably mounted on the shaft 30 on which the member 35 of the Geneva movement mechanism is rigidly mounted.

Rigid with the spur gear wheel 34 is the member 36 of a conventional type of punch-press clutch which is adapted to engage the plunger 37 which is slidably mounted in a recess of the disk 38 rigid with the shaft 30 and which is urged by the spring 39 in a direction to become disposed in the path of the shoulder 40 of the member 36 to cause said disk and the shaft 30 to be rotated by the gear-wheel 34.

A stop arm 41, pivotally mounted at one end upon a stud 42 of the machine frame, is provided at its other end with a cam projection 43 and a stop shoulder 44, the latter being maintained normally in the path of and in engagement with the plunger 37 by cooperation of a tension spring 45 engaged with the arm 41 and the stop projection 46 engaged in the slot 47 of the arm 41.

A manually operable trip lever mechanism of conventional type is operatively connected with the plunger 48 secured at one end to the arm 41 for swinging the same upwardly against the action of the spring 45 out of the path of the plunger 37 which instantly moves into the path of one of the three radial shoulders 40 of the member 36 and causes the latter to actuate the shaft 30. The arm 41 is restored almost instantly to its normal position, shown in Fig. 4, wherein the cam projection 43 is so disposed as to restore the plunger 37 to its normal position as it approaches the end of a complete revolution at the end of which it is again engaged by the stop shoulder 44 of the arm 41.

When the said plunger 37 is in the last-mentioned position, the arm 28 of the crank 29 will be in the position shown in Fig. 10, wherein it holds the member 27 of the Geneva movement against rotation. From this position the said arm 28 must rotate clockwise through an arc of 270 degrees before it again actuates the member 27, the rotation of the latter being through an arc of 90 degrees for each complete revolution of the shaft 30.

During the rotation of the shaft 30 through the said arc of 270 degrees the wire-feeding and cut-off mechanism of the machine is actuated. The said mechanism includes the guide tube 49 which is axially aligned with the wire receiving bore of the head 1 when the latter is in its normal position, determined by the period of rest of the member 27 of the Geneva movement. The wire 50 fed through the said tube from a conventional wire straightening mechanism 51, indicated but not illustrated in detail in Fig. 1, is illustrated diagrammatically by a single line in Fig. 1.

Between the mechanism 51 and tube 49 the wire 50 is engaged in the opposed peripheral grooves 52 of the disks 53 rigid with intermeshed spur-gear wheels 54 and 55.

The shaft of the said gear wheel 54 is journalled in a bearing rigid wih the machine frame (see Fig. 2), whereas, the bearing 56 for the shaft of the gear wheel 55 is carried by the reciprocable, but non-rotatable, plunger 57 which is urged toward the bearing for wheel 54 by means of the spring 58 which serves to cause the wire 50 to be very firmly engaged between the disks 53.

The shaft 59 of the gear wheel 54 is rigid with a pair of companion ratchet wheels 60 actuated by means of spring-urged pawls 61 carried by an arm 62 of a disk 63 disposed loosely on the shaft 59 between the ratchet wheels 60. Another arm 64 of said disk 63 is connected by means of connecting rod 65 with the crank-pin 66 of a member 67 rigidly mounted upon the shaft 30, there being universal joint connections of the ends of said connecting rod with the said arm 64 and crank-pin 66.

Figures 2, 3:
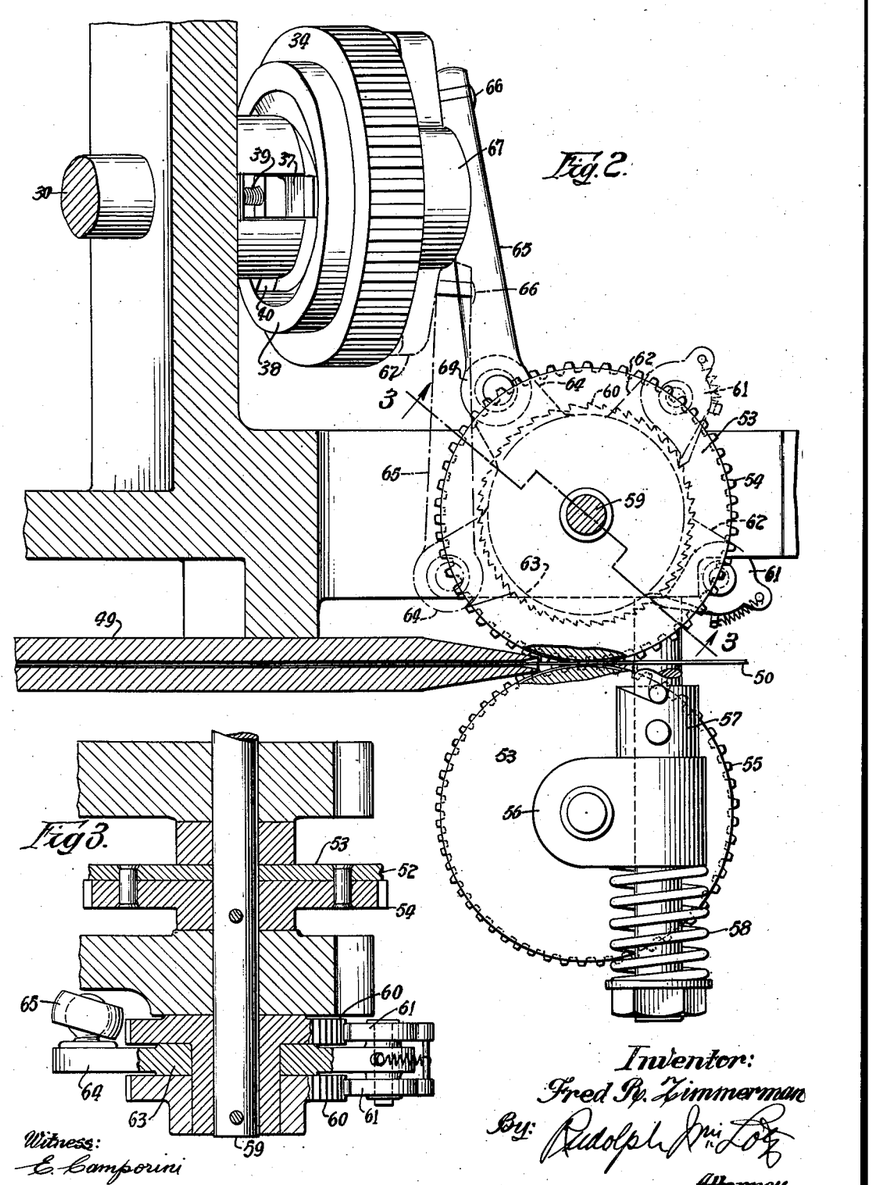
Fig. 2 is substantially a fragmentary plan sectional view on an enlarged scale, taken on the line 2—2 of Fig. 1.
Fig. 3 is a fragmentary detail sectional view taken on the line 3—3 of Fig. 2.

In Fig. 2 the connecting rod 65 is shown disposed at the upper limit of its stroke determined also by the normal position of the punch-press clutch. As the shaft 30 begins its rotation and during the first half of its complete revolution, the said disk 63 will be rotated until it attains the position wherein the pawl-carrying arm 62 of said disk is shown in full lines. During this rotation of about 90 degrees, the pawls 61 actuate the ratchet wheels 60 and, therefore, the wire-feeding disks are actuated to feed a length of wire to the head 1. During the reverse rotation of the disk 63, the said ratchet wheels are idle and during the return movement of the said pawls the wire cutting operation is performed and substantially at the instant of completion of this return stroke, the head 1 will begin to rotate.

Figure 8:
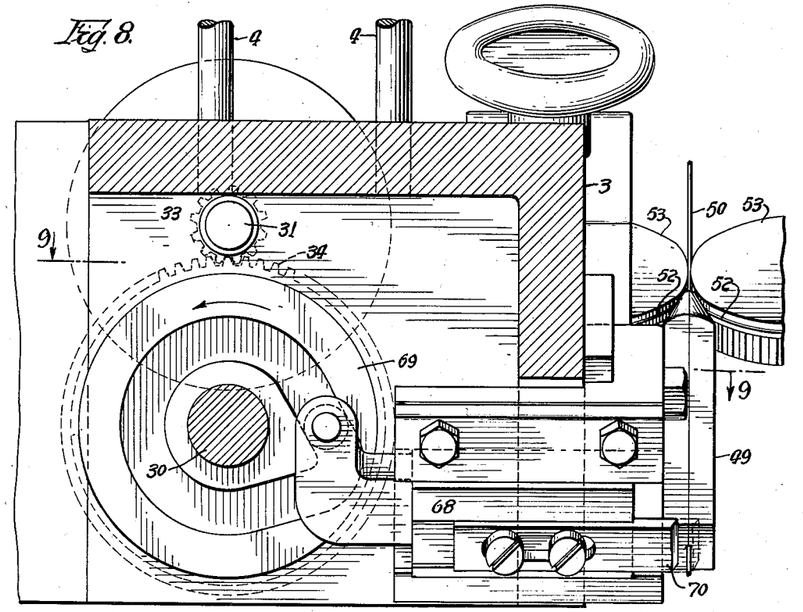
Fig. 8 is a vertical transverse sectional view on an enlarged scale, taken on the line 8—8 of Fig. 1.
Figure 9:
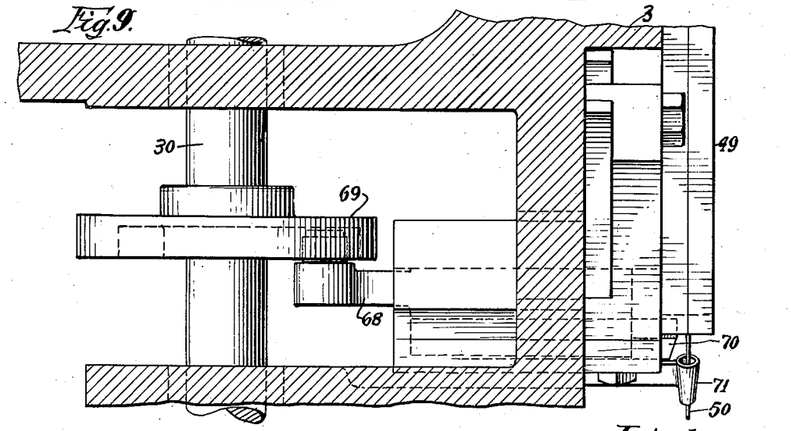
Fig. 9 is a detail plan sectional view taken on the line 9—9 of Fig. 8.

The wire is cut by means of the cutting plunger 68 which is actuated by the grooved cam 69 rigid with the shaft 30 which is illustrated in detail in Figs. 8 and 9. A cutting blade 70 is adjustably mounted on the said plunger 68 and is projected past the delivery end of the tube 49 with which it cooperates as a shearing member to cut the wire.

Spaced from and axially aligned with the tube 49 is a guide head 71 through which the wire 50 is projected and which, preferably, is equipped with frictional wire-engaging means of any well-known type for preventing the cut-off wire from being projected beyond its predetermined position.

It is desirable and necessary that the lengths of wire fed to the head 1 shall be variable to the extent necessary to accommodate the same to upholstery springs composed respectively of wires of different gauges, it being obvious that the length of wire requisite to tie together a pair of springs made of heavy gauge wire must be greater than that required to tie a pair of springs made of small gauge wire.

It is also necessary that the coiling of the wire ends about the crossing points of the springs 8 shall be such as will obviate projection of terminal end portions of the tie wires outwardly from the coils thereof in order to avoid injury to the hands of those who handle the spring assemblies in the manufacture thereof and subsequently in the incorporation thereof into mattresses.

Figures 5, 7:
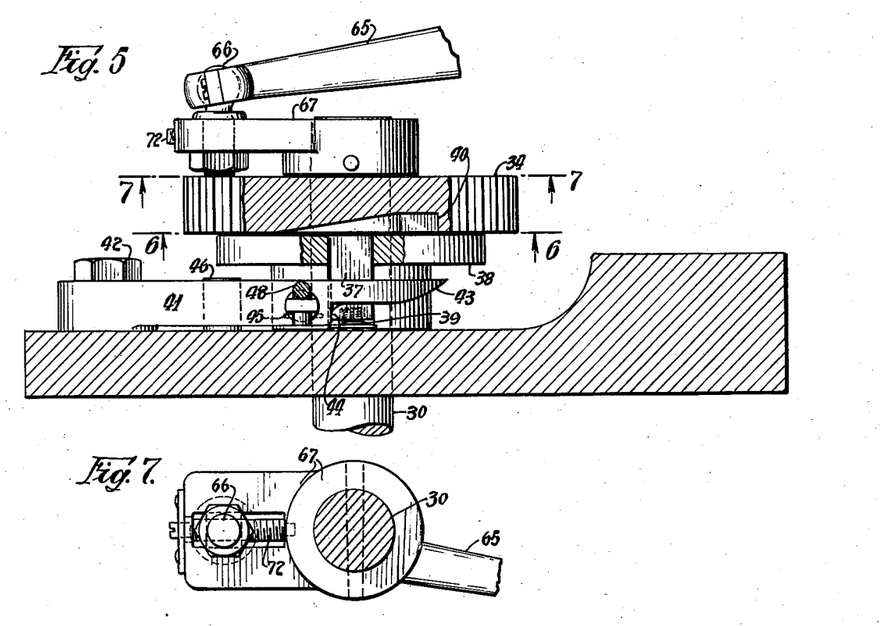
Fig. 5 is a fragmentary detail sectional view taken on the line 5—5 of Fig. 4.
Fig. 6 and Fig. 7 are detail sectional views taken on the lines 6—6 and 7—7, respectively, of Fig. 5.
Figure 6:
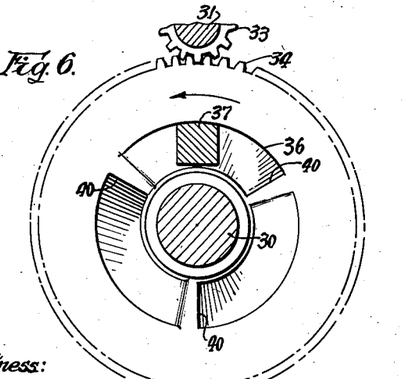

To this end, as shown in Figs. 5 and 7, the crank pin 66 of the member 67 is rendered adjustable radially of the axis of the shaft 30 to vary the length of the stroke of the connecting rod 65.

In the instance illustrated the crank pin 66 is slidable in a radial slot of the member or crank 67. A set screw, 72, is disposed radially of the axis of the shaft 30 within said slot of the crank 67 and is rotatable but held against longitudinal movement relatively to the latter and has threaded engagement with the crank pin 66 for moving the same toward and from the axis of the shaft 30 thus providing a means for effecting a very accurate adjustment of the length of stroke of the connecting rod 65 and the length of wire fed to the head 1 during each stroke thereof in one direction as above described.

In all circumstances it is preferable that the length of wire fed to the head 1 be so short that its end portions will be closely coiled about the overlapped portions of the springs 8 before the head 1 has completed its cycle of rotations as this will assure the absence of any outwardly projecting ends of the wires, this being controlled in part by the adjustment of the crank pin 66.

Each head 1 is rendered easily replaceable by another thereof wherein the width of the slot 6 is greater or less than that of the head replaced thereby to accord with the differences in gauges of wires of which the springs 8 are composed, the width of slot being substantially equal to twice the gauge of said wire plus the gauge of the tie wire in order to assure a very close coiling of the end portions of the latter about the springs 8.

The essential advantages of the improvements hereinabove described lie in the provision of means for assuring the return of the head 1 to the position wherein the recess 6 thereof is disposed parallel with the table 5 and wherein the rotation of said head 1 begins and ends relatively slowly and attains maximum speed of rotation midway between the start and termination of said rotation.

Another advantage is obtained by the cooperation of the spring-held plunger 22 and the recess in the member 20 of gear wheel 12 which it engages to assure the accurate positioning of the head 1 while at rest, thus taking up any slack or lost motion between the gear wheel 11 and the gear element 7 of the said head 1.

Obviously, the punch-press clutch starts each rotation of the shaft 30 very suddenly but by reason of the fact that said shaft actuates no part of any of the mechanisms which might offer resistance to its rotation until said shaft has completed a half revolution and three-quarters of a revolution, respectively, this sudden starting, as well as stopping of said shaft, does not subject the mechanism actuated by said shaft to any shocks and, further, said shaft is not subjected to any undue stress because of the sudden starts and stops thereof.

Elimination of undue stresses and strains on the mechanisms is also obviated by means of the spring-held clutch member 17 which is self-released in the event that the lengths of wire 15 become displaced in the head 1 or the overlapped portions of the springs 8 are not properly positioned in the head 1 and thus practically prevent rotation of said head.

Thus, while the operation of the machine may be interrupted occasionally because of carelessness on the part of the operator, such interruptions are limited to very brief intervals because of the means employed for preventing injuries to the mechanisms.

I claim as my invention:—

1. In a machine of the kind specified, a rotatable wire coiling head, a constantly rotating drive shaft, a manually controlled clutch mechanism actuated by said shaft, a countershaft actuated by said clutch mechanism, a Geneva movement member actuated by said countershaft, a gear train including the driven member of said Geneva movement connecting said coiling head with said countershaft for effecting rotation of said head during a predetermined portion of each complete revolution of said countershaft, a wire feeding mechanism actuated by said countershaft during a portion of each revolution of the latter wherein said coiling head is idle, and a wire cutting mechanism actuated by said countershaft for effecting cut-off of a length of wire fed through said head at the instant of completion of the wire feeding operation and the beginning of rotation of said head.

2. In a machine of the kind specified, a rotatable wire coiling head, a constantly rotating drive shaft, a manually controlled punch press clutch mechanism actuated by said shaft, a countershaft actuated by said clutch mechanism, a Geneva movement member actuated by said countershaft, a gear train including the driven member of said Geneva movement connecting said coiling head with said countershaft for effecting rotation of said head during a predetermined portion of each complete revolution of said countershaft, a self-releasing clutch mechanism included in said gear train for permitting said head to remain at rest in event of undue resistance to its rotation, a wire feeding mechanism actuated by said countershaft during a portion of each revolution of the latter wherein said coiling head is idle, and a wire cutting mechanism actuated by said countershaft for effecting cut-off of a length of wire fed through said head at the instant of completion of the wire feeding operation and the beginning of rotation of said head.

3. In a machine of the type specified a rotatable coiling head equipped with a slot having parallel walls and adapted to receive overlapped arcuate portions of the terminal coils of a pair of upholstery springs having parallel axes disposed perpendicularly to a supporting surface for the other terminal coils of said springs, mechanism for rotating said head at intervals through a predetermined number of substantially complete revolutions from and to a position wherein the parallel walls of said slot are substantially parallel with said supporting surface, said mechanism including a spur-gear formation on said head, a gear train connecting said formation with a driving means, and automatic spring-urged means associated with said gear train and acting independently of the driving means to impart to the gear train a final adjusting movement whereby to restore said head to its normal position and so maintain the same during periods of rest thereof.

4. In a machine of the type specified, a rotatable coiling head equipped with a slot having parallel walls and adapted to receive overlapped arcuate portions of the terminal coils of a pair of upholstery springs having parallel axes disposed perpendicularly to a supporting surface for the other terminal coils of said springs, mechanism for rotating said head at intervals through a predetermined number of substantially complete revolutions from and to a position wherein the parallel walls of said slot are substantially parallel with said supporting surface, said mechanism including a spur-gear formation on said head, a gear train connecting said formation with a driving means, a spring-held self-releasing tooth clutch associated with gear train for causing said head to remain at rest during operation of said gear train in the event of undue resistance to rotation of said head, and automatic spring-urged means associated with said gear train and acting independently of the driving means to impart to the gear train a final adjusting movement whereby to restore said head to its normal position and so maintain the same during periods of rest thereof.

5. In a machine of the type specified, a rotatable coiling head equipped with a slot having parallel walls and adapted to receive overlapped arcuate portions of the terminal coils of a pair of upholstery springs having parallel axes disposed perpendicularly to a supporting surface for the other terminal coils of said springs, mechanism for rotating said head at intervals through a predetermined number of substantially complete revolutions from and to a position wherein the parallel walls of said slot are substantially parallel with said supporting surface, said mechanism including a spur-gear formation on said head, a gear train connecting said formation with a driving means, a spring-held, self-releasing clutch member carried by the head-driving member of the gear train and normally engaged with the member of said train driving said carrying member for causing said head to remain at rest during operation of said gear train in the event of undue resistance to rotation of said head, a Geneva movement for driving said gear train and effecting slow starting and stopping thereof and holding the same against operation between periods of actuation thereof, and manually controlled means for actuating said Geneva movement at will.

6. In a machine of the type specified, a rotatable coiling head equipped with a slot having parallel walls and adapted to receive overlapped arcuate portions of the terminal coils of a pair of upholstery springs having parallel axes disposed perpendicularly to a supporting surface for the other terminal coils of said springs, mechanism for rotating said head at intervals through a predetermined number of substantially complete revolutions from and to a position wherein the parallel walls of said slot are substantially parallel with said supporting surface, said mechanism including a spur-gear formation on said head, a gear train connecting said formation with a driving means, a spring-held, self-releasing clutch member carried by the head-driving member of the gear train and normally engaged with the member of said train driving said carrying member for causing said head to remain at rest during operation of said gear train in the event of undue resistance to rotation of said head, automatic spring-urged means associated with said gear train and acting independently of the driving means to impart to the gear train a final adjusting movement whereby to restore said head to its normal position and so maintain the same during periods of rest thereof, a Geneva movement for driving said gear train and effecting slow starting and stopping thereof and holding the same against operation between periods of actuation thereof, and manually controlled means for actuating said Geneva movement at will.

7. In a machine of the type specified, a rotary wire coiling head, mechanism for actuating the same including a gear train operatively connected with said head, and including a Geneva movement, a drive shaft for actuating the latter during a predetermined portion of each revolution of said shaft, a mechanism for feeding a predetermined length of wire to said head preceding each actuation of said Geneva movement, a drive shaft, gearing between the latter and said first-named shaft, a manually controlled punch-press clutch mechanism interposed in said gearing for controlling actuation of said first-named shaft by said drive shaft and means on said first-named shaft for actuating said wire feeding mechanism during a predetermined portion of each revolution of said first-named shaft immediately preceding each actuation of said Geneva movement and mechanism for automatically cutting said wire at a point in the rotation of the first-named shaft between the completion of the actuation of the wire feeding mechanism and the beginning of actuation of said Geneva movement.

8. In a machine of the type specified, a constantly rotating drive shaft, a countershaft, normally inoperative gearing between said shafts, rotatable wire coiling head, a gear train operatively connecting the same with said countershaft, means included in said gear train for actuation thereof during a predetermined part of each complete rotation of said countershaft and for imparting to said head a predetermined number of complete revolutions during each actuation of said gear train for effecting restoration of said head to a predetermined position after each operation thereof, means associated with said gear train and operating automatically independently thereof for accurately restoring said head to its predetermined normal position after each actuation thereof by taking up lost motion in the gear train, mechanism for feeding a predetermined length of wire to said head preceding each actuation thereof, and cutting said length of wire from the body of said wire, connection between said feeding and cutting mechanism and said countershaft for actuation by the latter during a part of each revolution thereof preceding the actuation of said gear train, and a manually controlled punch-press clutch mechanism for effecting operation of the gearing between the drive shaft and said countershaft for causing the latter to make a single complete revolution at each throw-in of said clutch mechanism.

9. In a machine of the type specified, a constantly rotating drive shaft, a countershaft, normally inoperative gearing between said shafts, a rotatable wire coiling head, a gear train operatively connecting the same with said countershaft, means including in said gear train for actuation thereof during a predetermined part of each complete rotation of said countershaft and for imparting to said head a predetermined number of complete revolutions during each actuation of said gear train for effecting restoration of said head to a predetermined position after each operation thereof, means associated with said gear train and operating automatically independently thereof for accurately restoring said head to its predetermined normal position after each actuation thereof by taking up lost motion in the gear train, a self-releasing springheld clutch interposted in said gear train for permitting said head to remain inoperative in event of undue resistance to rotation thereof, mechanism for feeding a predetermined length of wire to said head preceding each actuation thereof and cutting said length of wire from the body of said wire, connection between said feeding and cutting mechanism and said countershaft for actuation by the latter during a part of each revolution thereof preceding the actuation of said gear train, and a manually controlled punch-press clutch mechanism for effecting operation of the gearing between the drive shaft and said counter shaft for causing the latter to make a single complete revolution at each throw-in of said clutch mechanism.

10. In a machine of the type specified, a constantly rotating drive shaft, a countershaft, normally in operative gearing between said shafts, rotatable wire coiling head, a gear train operatively connecting the same with said countershaft, means including in said gear train for actuation thereof during a predetermined part of each complete rotation of said countershaft and for imparting to said head a predetermined number of complete revolutions during each actuation of said gear train for effecting restoration of said head to a predetermined position after each operation thereof, a self-releasing, springheld clutch interposed in said gear train for permitting said head to remain inoperative in event of undue resistance to rotation thereof, mechanism for feeding a predetermined length of wire to said head preceding each actuation thereof and cutting said length of wire from the body of said wire, connection between said feeding and cutting mechanism and said countershaft for actuation by the latter during a part of each revolution thereof preceding the actuation of said gear train, and a manually controlled punch-press clutch mechanism for effecting operation of the gearing between the drive shaft and said countershaft for causing the latter to make a single complete revolution at each throw-in of said clutch mechanism.

11. In a machine of the kind specified, a continuously rotating drive shaft, a countershaft, a manually controlled clutch mechanism operatively connecting the same with the drive shaft for imparting to said countershaft a single complete revolution at selected intervals, a rotatable coiling head geared to said countershaft for imparting to said head a predetermined number of complete revolutions during a predetermined part of each revolution of said countershaft, a wire feeding mechanism for said head comprising a pair of rotatable wire engaging feed members, a ratchet wheel for rotating the said feed members through a predetermined arc at intervals, a pawl actuating said ratchet wheel and connected with said countershaft for actuation thereby during a predetermined portion of each revolution of said countershaft preceding the actuation of said head, and a wire cutting means actuated by said countershaft for cutting off the length of wire fed by said feeding members following the feed movement of the latter and preceding the actuation of said head.

12. In a machine of the kind specified, a continuously rotating drive shaft, a countershaft, a manually controlled clutch mechanism operatively connecting the same with the drive shaft for imparting to said countershaft a single complete revolution at selected intervals, a rotatable coiling head geared to said countershaft for imparting to said head a predetermined number of complete revolutions during a predetermined part of each revolution of said countershaft, a wire feeding mechanism for said head comprising a pair of rotatable wire engaging feed members, a ratchet wheel for rotating the said feed members through a predetermined arc at intervals, a pawl actuating said ratchet wheel and connected with said countershaft for actuation thereby during a predetermined portion of each revolution of said countershaft preceding the actuation of said head, a wire guide disposed between said head and said feed members, and a wire cutting device associated with said guide and actuated by said countershaft for cutting off the length of wire fed by said feeding members following the feed movement of the latter and preceding the actuation of said head.

13. In a machine of the kind specified, a continuously rotating drive shaft, a countershaft, manually controlled clutch mechanism connecting said countershaft with said drive shaft for effecting a single complete revolution of said countershaft at selected intervals, a coiling head geared to said countershaft for rotation by the latter through a predetermined number of complete revolutions throughout a predetermined portion of each revolution of said countershaft, a pair of rotatable wire-feeding disks for feeding a predetermined length of wire to said coiling head at intervals, connection between said disks and said countershaft for actuating the former during another part of each revolution of the latter preceding the actuation of said coiling head, and a wire cutting device actuated by said countershaft for cutting off the length of wire fed by said disks following each operation of the latter and preceding each actuation of said coiling head.

14. In a machine of the kind specified, a continuously rotating drive shaft, a countershaft, a manually controlled clutch mechanism operatively connecting the same with the drive shaft for imparting to said countershaft a single complete revolution at selected intervals, a rotatable coiling head geared to said countershaft for imparting to said head a predetermined number of complete revolutions during a predetermined part of each revolution of said countershaft, a wire feeding mechanism for said head comprising a pair of rotatable wire-engaging feed members, a ratchet wheel for rotating the said feed members through a predetermined arc at intervals, a pawl actuating said ratchet wheel and connected with said countershaft for actuation thereby during a predetermined portion of each revolution of said countershaft preceding the actuation of said head, means for varying the arc of rotation of said feed members for varying the length of wire fed to said coiling head at each actuation of said feeding means, and a wire cutting means actuated by said countershaft for cutting off the length of wire fed by said feeding members following the feed movement of the latter and preceding the actuation of said head.

15. In a machine of the kind specified, a continuously rotating drive shaft, a countershaft, a manually controlled clutch mechanism operatively connecting the same with the drive shaft for imparting to said countershaft a single complete revolution at selected intervals, a rotatable coiling head geared to said countershaft for imparting to said head a predetermined number of complete revolutions during a predetermined part of each revolution of the said countershaft, a wire feeding mechanism for said head comprising a pair of rotatable wire engaging feed members, a ratchet wheel for rotating the said feed members through a predetermined arc at intervals, a pawl for actuating said ratchet wheel connected with said countershaft for actuation thereby during a predetermined portion of each revolution of said countershaft preceding the actuation of said head, means for varying the arc of rotation of said feed members for varying the length of wire fed to said coiling head at each actuation of said feed members, a wire cutting means actuated by said countershaft for cutting off the length of wire fed by said feeding members following the feed movement of the latter and preceding the actuation of the head, a wire guide disposed between said head and said feed members, a wire cutting device associated with said guide and actuated by said countershaft for cooperation with said guide to effect a shearcut of the wire, and a means associated with said wire guide for frictionally resisting the feed of the wire and preventing displacement of the cut-off end portion of the latter relatively to said preceding rotation of the latter.

FRED R. ZIMMERMAN.